US009929655B2

(12) United States Patent
Fang et al.

(10) Patent No.: US 9,929,655 B2
(45) **Date of Patent: *Mar. 27, 2018**

(54) SYSTEMS AND METHODS FOR FLYBACK POWER CONVERTERS WITH SWITCHING FREQUENCY AND PEAK CURRENT ADJUSTMENTS

(71) Applicant: GUANGZHOU ON-BRIGHT ELECTRONICS CO., LTD., Guangzhou (CN)

(72) Inventors: Lieyi Fang, Shanghai (CN); Guo Wei Lin, Guangzhou (CN)

(73) Assignee: Guangzhou On-Bright Electronics Co., Ltd., Guangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,290

(22) Filed: Dec. 12, 2016

(65) Prior Publication Data

US 2017/0187293 A1 Jun. 29, 2017

Related U.S. Application Data

(63) Continuation of application No. 14/293,280, filed on Jun. 2, 2014, now Pat. No. 9,559,598, which is a (Continued)

(30) Foreign Application Priority Data

May 23, 2011 (CN) .......................... 2011 1 0144768

(51) Int. Cl.
*H02M 3/335* (2006.01)

(52) U.S. Cl.
CPC ............................... *H02M 3/33507* (2013.01)

(58) Field of Classification Search
CPC ............... H02M 1/08; H02M 3/33516; H02M 3/33523; H02M 3/33546; H02M 2001/0019
(Continued)

(56) References Cited

U.S. PATENT DOCUMENTS 3,912,340 A 10/1975 Bertolasi
5,247,241 A 9/1993 Ueda
(Continued)

FOREIGN PATENT DOCUMENTS

CN 1841893 A 10/2006
CN 1917322 A 2/2007
(Continued)

OTHER PUBLICATIONS

Chinese Patent Office, Office Action dated Dec. 8, 2014, in Application No. 201110034669.9.
(Continued)

*Primary Examiner* — Jeffrey Sterrett
(74) *Attorney, Agent, or Firm* — Jones Day

(57) ABSTRACT

System and method for regulating a power converter. The system includes a comparator configured to receive a first signal and a second signal and generate a comparison signal based on at least information associated with the first signal and the second signal. The first signal is associated with at least an output current of a power converter. Additionally, the system includes a pulse-width-modulation generator configured to receive at least the comparison signal and generate a modulation signal based on at least information associated with the comparison signal, and a driver component configured to receive the modulation signal and output a drive signal to a switch to adjust a primary current flowing through a primary winding of the power converter. The
(Continued)

modulation signal is associated with a modulation frequency corresponding to a modulation period.

20 Claims, 9 Drawing Sheets

Related U.S. Application Data continuation of application No. 13/164,608, filed on Jun. 20, 2011, now Pat. No. 8,891,256.

(58) Field of Classification Search
USPC ......... 363/21.01, 21.04, 21.05, 21.08, 21.09, 363/21.1, 21.11, 21.12, 21.123, 21.16, 363/21.17, 21.18, 95, 97, 98, 21.13
See application file for complete search history.

(56) References Cited

U.S. PATENT DOCUMENTS 5,497,119 A 3/1996 Tedrow et al.
5,568,044 A 10/1996 Bittner
5,729,448 A 3/1998 Haynie et al.
6,134,060 A 10/2000 Ryat
6,292,376 B1 9/2001 Kato
6,366,066 B1 4/2002 Wilcox
6,366,070 B1 4/2002 Cooke et al.
6,381,151 B1 4/2002 Jang
6,545,513 B2 4/2003 Tsuchida et al.
6,556,478 B2 4/2003 Willis et al.
6,713,995 B2 3/2004 Chen
6,798,086 B2 9/2004 Utsunomiya
6,947,298 B2 9/2005 Uchida
6,954,056 B2 10/2005 Hoshino et al.
6,972,528 B2 12/2005 Shao
6,972,548 B2 12/2005 Tzeng et al.
6,977,824 B1 12/2005 Yang et al.
7,035,119 B2 4/2006 Koike
7,054,169 B2 5/2006 Huh et al.
7,116,089 B1 10/2006 Nguyen et al.
7,173,404 B2 2/2007 Wu
7,208,927 B1 4/2007 Nguyen
7,262,587 B2 8/2007 Takimoto et al.
7,265,999 B2 9/2007 Murata et al.
7,345,895 B2 3/2008 Zhu et al.
7,394,634 B2 7/2008 Fang et al.
7,414,865 B2 8/2008 Yang
7,456,623 B2 11/2008 Hasegawa et al.
7,492,619 B2 2/2009 Ye et al.
7,522,431 B2 4/2009 Huynh et al.
7,605,576 B2 10/2009 Kanakubo
7,609,039 B2 10/2009 Hasegawa
7,684,220 B2 3/2010 Fang et al.
7,684,462 B2 3/2010 Ye et al.
7,826,237 B2 11/2010 Zhang et al.
7,852,055 B2 12/2010 Michishita
7,898,825 B2 3/2011 Mulligan et al.
7,990,202 B2 8/2011 Fang et al.
8,085,027 B2 12/2011 Lin et al.
8,213,203 B2 7/2012 Fei et al.
8,305,776 B2 11/2012 Fang
8,331,112 B2 12/2012 Huang et al.
8,339,814 B2 12/2012 Zhang et al.
8,391,028 B2 3/2013 Yeh
8,488,342 B2 7/2013 Zhang et al.
8,526,203 B2 9/2013 Huang et al.
8,879,289 B2 11/2014 Lin et al.
8,891,256 B2 * 11/2014 Fang ................ H02M 3/33523 363/21.05
8,971,062 B2 3/2015 Huang et al.
8,982,585 B2 3/2015 Fang
9,088,217 B2 7/2015 Zhang et al.
9,325,234 B2 4/2016 Zhang et al.
9,350,252 B2 5/2016 Zhang et al.
9,379,623 B2 6/2016 Zhang et al.
9,379,624 B2 6/2016 Lin et al.
9,385,612 B2 7/2016 Zhang et al.
9,559,598 B2 * 1/2017 Fang ................ H02M 3/33523
9,577,537 B2 2/2017 Zhang et al.
2002/0080625 A1 6/2002 Goyhenetche et al.
2002/0080631 A1 6/2002 Kanouda et al.
2003/0174520 A1 9/2003 Bimbaud
2004/0075600 A1 4/2004 Vera et al.
2005/0057238 A1 3/2005 Yoshida
2005/0116697 A1 6/2005 Matsuo et al.
2005/0222646 A1 10/2005 Kroll et al.
2005/0270807 A1 12/2005 Strijker
2006/0034102 A1 2/2006 Yang et al.
2006/0043953 A1 3/2006 Xu
2006/0050539 A1 3/2006 Yang et al.
2006/0055433 A1 3/2006 Yang et al.
2006/0273772 A1 12/2006 Groom
2007/0115696 A1 5/2007 Berghegger
2007/0171687 A1 7/2007 Kogel et al.
2007/0241733 A1 10/2007 Chen et al.
2007/0273345 A1 11/2007 Chen et al.
2008/0061754 A1 3/2008 Hibi
2008/0112193 A1 5/2008 Yan et al.
2008/0157742 A1 7/2008 Martin et al.
2008/0159378 A1 7/2008 Kris
2008/0225563 A1 9/2008 Seo
2008/0252345 A1 10/2008 Deschamp et al.
2009/0051336 A1 2/2009 Hartlieb et al.
2009/0058387 A1 3/2009 Huynh et al.
2009/0073727 A1 3/2009 Huynh et al.
2009/0121697 A1 5/2009 Aiura et al.
2009/0141520 A1 6/2009 Grande et al.
2009/0175057 A1 7/2009 Grande et al.
2009/0206814 A1 8/2009 Zhang et al.
2009/0219000 A1 9/2009 Yang
2009/0251219 A1 10/2009 Fiocchi et al.
2009/0302817 A1 12/2009 Nagai
2010/0026270 A1 2/2010 Yang et al.
2010/0061126 A1 3/2010 Huynh et al.
2010/0128501 A1 5/2010 Huang et al.
2010/0141178 A1 6/2010 Negrete et al.
2010/0219802 A1 9/2010 Lin et al.
2010/0225293 A1 9/2010 Wang et al.
2011/0044076 A1 2/2011 Zhang et al.
2011/0096574 A1 4/2011 Huang
2011/0149614 A1 6/2011 Stracquadaini
2011/0182089 A1 7/2011 genannt Berghegger
2011/0248770 A1 10/2011 Fang et al.
2011/0267853 A1 11/2011 Yang et al.
2012/0013321 A1 1/2012 Huang et al.
2012/0075891 A1 3/2012 Zhang et al.
2012/0139435 A1 6/2012 Storm
2012/0147630 A1 6/2012 Cao et al.
2012/0153919 A1 6/2012 Garbossa et al.
2012/0195076 A1 8/2012 Zhang et al.
2012/0224397 A1 9/2012 Yeh
2012/0257423 A1 10/2012 Fang
2012/0281438 A1 11/2012 Fang et al.
2012/0320640 A1 12/2012 Baurle et al.
2013/0027989 A1 1/2013 Fang
2013/0033905 A1 2/2013 Lin et al.
2013/0051090 A1 2/2013 Xie et al.
2013/0182476 A1 7/2013 Yang et al.
2013/0223107 A1 8/2013 Zhang et al.
2013/0272033 A1 10/2013 Zhang et al.
2013/0308350 A1 11/2013 Huang et al.
2014/0078790 A1 3/2014 Lin et al.
2014/0160809 A1 6/2014 Lin et al.
2015/0055378 A1 2/2015 Lin et al.
2015/0162820 A1 6/2015 Zhang et al.
2015/0180347 A1 6/2015 Fang et al.
2015/0295499 A1 10/2015 Zhang et al.
2015/0311804 A1 10/2015 Fang
2016/0028318 A1 1/2016 Fang et al.
2016/0218631 A1 7/2016 Zhang et al.
2016/0315543 A1 10/2016 Zhang et al.
2016/0329818 A1 11/2016 Lin et al.

(56) References Cited

U.S. PATENT DOCUMENTS

| | | | |
|---|---|---|---|
| 2016/0329821 | A1 | 11/2016 | Zhang et al. |
| 2016/0354792 | A1 | 12/2016 | Zhang et al. |

FOREIGN PATENT DOCUMENTS

| | | | |
|---|---|---|---|
| CN | 1929274 | A | 3/2007 |
| CN | 1964172 | A | 5/2007 |
| CN | 1988347 | A | 6/2007 |
| CN | 101034851 | A | 9/2007 |
| CN | 101039077 | A | 9/2007 |
| CN | 101079576 | A | 11/2007 |
| CN | 101127495 | A | 2/2008 |
| CN | 101247083 | A | 8/2008 |
| CN | 101295872 | A | 10/2008 |
| CN | 101350562 | A | 1/2009 |
| CN | 101515756 | A | 8/2009 |
| CN | 101552560 | A | 10/2009 |
| CN | 101577468 | A | 11/2009 |
| CN | 101577488 | A | 11/2009 |
| CN | 101826796 | A | 9/2010 |
| CN | 101515756 | B | 11/2011 |
| CN | 102332826 | A | 1/2012 |
| CN | 102474964 | A | 5/2012 |
| CN | 102624237 | A | 8/2012 |
| CN | 102651613 | A | 8/2012 |
| CN | 102709880 | A | 10/2012 |
| CN | 102723945 | A | 10/2012 |
| CN | 102983760 | A | 3/2013 |
| CN | 103166198 | A | 6/2013 |
| CN | 103296904 | A | 9/2013 |
| TW | 200840174 | A | 10/2008 |
| TW | 200937157 | A | 9/2009 |
| TW | I 437808 | | 5/2014 |
| TW | I 448060 | | 8/2014 |

OTHER PUBLICATIONS

Chinese Patent Office, Office Action dated Jun. 4, 2014, in Application No. 201110144768.2.

Chinese Patent Office, Office Action dated Nov. 12, 2013, in Application No. 201110051423.2.

Chinese Patent Office, Office Action dated Nov. 14, 2013, in Application No. 201110224933.5.

Chinese Patent Office, Office Action dated Nov. 5, 2013, in Application No. 201210529679.4.

Chinese Patent Office, Office Action dated Dec. 4, 2015, in Application No. 201410226277.6.

Chinese Patent Office, Office Action dated Nov. 5, 2013, in Application No. 201310078547.9.

Chinese Patent Office, Office Action dated Nov. 25, 2015, in Application No. 201310656906.4.

Chinese Patent Office, Office Action dated Nov. 7, 2013, in Application No. 201210342097.5.

Taiwan Patent Office, Office Action dated Mar. 3, 2014, in Application No. 100127088.

Taiwan Patent Office, Office Action dated May 6, 2015, in Application No. 102116550.

Taiwan Patent Office, Office Action dated Oct. 1, 2014, in Application No. 102116551.

Taiwan Patent Office, Office Action dated Oct. 16, 2015, in Application No. 102116550.

Taiwan Patent Office, Office Action dated Oct. 6, 2014, in Application No. 102115002.

United States Patent and Trademark Office, Office Action dated Aug. 20, 2015, in U.S. Appl. No. 13/646,268.

United States Patent and Trademark Office, Office Action dated May 17, 2016, in U.S. Appl. No. 13/646,268.

United States Patent and Trademark Office, Office Action dated Nov. 22, 2016, in U.S. Appl. No. 13/646,268.

United States Patent and Trademark Office, Office Action dated Nov. 2, 2016, in U.S. Appl. No. 14/824,018.

United States Patent and Trademark Office, Office Action dated Dec. 29, 2016, in U.S. Appl. No. 15/040,674.

United States Patent and Trademark Office, Office Action dated Mar. 7, 2017, in U.S. Appl. No. 15/099,419.

United States Patent and Trademark Office, Notice of Allowance dated Sep. 19, 2017, in U.S. Appl. No. 13/646,268.

United States Patent and Trademark Office, Notice of Allowance dated Sep. 11, 2017, in U.S. Appl. No. 15/040,674.

United States Patent and Trademark Office, Office Action dated Aug. 29, 2017, in U.S. Appl. No. 15/098,002.

United States Patent and Trademark Office, Office Action dated Oct. 4, 2017, in U.S. Appl. No. 15/099,419.

United States Patent and Trademark Office, Notice of Allowance dated Jul. 26, 2017, in U.S. Appl. No. 13/646,268.

United States Patent and Trademark Office, Office Action dated Jun. 30, 2017, in U.S. Appl. No. 14/824,018.

United States Patent and Trademark Office, Notice of Allowance dated Jul. 5, 2017, in U.S. Appl. No. 15/040,674.

United States Patent and Trademark Office, Office Action dated May 26, 2017, in U.S. Appl. No. 15/081,523.

United States Patent and Trademark Office, Office Action dated Mar. 22, 2017, in U.S. Appl. No. 15/152,362.

United States Patent and Trademark Office, Notice of Allowance dated Nov. 14, 2017, in U.S. Appl. No. 14/824,018.

United States Patent and Trademark Office, Notice of Allowance dated Dec. 1, 2017, in U.S. Appl. No. 15/081,523.

United States Patent and Trademark Office, Office Action dated Dec. 18, 2017, in U.S. Appl. No. 15/152,362.

* cited by examiner

SYSTEMS AND METHODS FOR FLYBACK POWER CONVERTERS WITH SWITCHING FREQUENCY AND PEAK CURRENT ADJUSTMENTS

1. CROSS-REFERENCES TO RELATED APPLICATIONS

This application is a continuation of U.S. patent application Ser. No. 14/293,280, filed Jun. 2, 2014, which is a continuation of U.S. patent application Ser. No. 13/164,608, filed Jun. 20, 2011, which claims priority to Chinese Patent Application No. 201110144768.2, filed May 23, 2011, all of these applications being incorporated by reference herein for all purposes.

Additionally, U.S. patent application Ser. Nos. 12/859,138 and 13/052,869 are incorporated by reference herein for all purposes.

2. BACKGROUND OF THE INVENTION

The present invention is directed to integrated circuits. More particularly, the invention provides switching frequency and peak current adjustments in response to loading changes. Merely by way of example, the invention has been applied to a flyback power converter. But it would be recognized that the invention has a much broader range of applicability.

Generally, a conventional power conversion system often uses a transformer to isolate the input voltage on the primary side and the output voltage on the secondary side. To regulate the output voltage, certain components, such as TL431 and an opto-coupler, can be used to transmit a feedback signal from the secondary side to a controller chip on the primary side. Alternatively, the output voltage on the secondary side can be imaged to the primary side, so the output voltage is controlled by directly adjusting some parameters on the primary side.

FIG. 1 is a simplified diagram showing a conventional flyback power conversion system with primary-side sensing and regulation. The power conversion system 100 includes a primary winding 110, a secondary winding 112, an auxiliary winding 114, a power switch 120, a current sensing resistor 130, an equivalent resistor 140 for an output cable, resistors 150 and 152, and a rectifying diode 160. For example, the power switch 120 is a bipolar transistor. In another example, the power switch 120 is a MOS transistor.

To regulate the output voltage within a predetermined range, information related to the output voltage and the output loading often needs to be extracted. In the power conversion system 100, such information can be extracted through the auxiliary winding 114. When the power switch 120 is turned on, the energy is stored in the secondary winding 112. Then, when the power switch 120 is turned off, the stored energy is released to the output terminal, and the voltage of the auxiliary winding 114 maps the output voltage on the secondary side as shown below.

$$V_{FB} = \frac{R_2}{R_1 + R_2} \times V_{aux} = k \times n \times (V_o + V_F + I_o \times R_{eq}) \quad \text{(Equation 1)}$$

where $V_{FB}$ represents a voltage at a node 154, and $V_{aux}$ represents the voltage of the auxiliary winding 114. $R_1$ and $R_2$ represent the resistance values of the resistors 150 and 152 respectively. Additionally, n represents a turns ratio between the auxiliary winding 114 and the secondary winding 112. Specifically, n is equal to the number of turns of the auxiliary winding 114 divided by the number of turns of the secondary winding 112. $V_o$ and $I_o$ represent the output voltage and the output current respectively. Moreover, $V_F$ represents the forward voltage of the rectifying diode 160, and $R_{eq}$ represents the resistance value of the equivalent resistor 140. Also, k represents a feedback coefficient as shown below:

$$k = \frac{R_2}{R_1 + R_2} \quad \text{(Equation 2)}$$

FIG. 2 is a simplified diagram showing a conventional operation mechanism for the flyback power conversion system 100. As shown in FIG. 2, the controller chip of the conversion system 100 uses a sample-and-hold mechanism. When the demagnetization process on the secondary side is almost completed and the current $I_{sec}$ of the secondary winding 112 almost becomes zero, the voltage $V_{aux}$ of the auxiliary winding 112 is sampled at, for example, point A of FIG. 2. The sampled voltage value is usually held until the next voltage sampling is performed. Through a negative feedback loop, the sampled voltage value can become equal to a reference voltage $V_{ref}$. Therefore, $$V_{FB} = V_{ref} \quad \text{(Equation 3)}$$

Combining Equations 1 and 3, the following can be obtained:

$$V_o = \frac{V_{ref}}{k \times n} - V_F - I_o \times R_{eq} \quad \text{(Equation 4)}$$

Based on Equation 4, the output voltage decreases with the increasing output current.

But the power conversion system 100 often cannot provide effective response to output loading changes. Hence it is highly desirable to improve the techniques of primary-side sensing and regulation.

3. BRIEF SUMMARY OF THE INVENTION

The present invention is directed to integrated circuits. More particularly, the invention provides switching frequency and peak current adjustments in response to loading changes. Merely by way of example, the invention has been applied to a flyback power converter. But it would be recognized that the invention has a much broader range of applicability.

According to one embodiment, a system for regulating a power converter includes a comparator configured to receive a first signal and a second signal and generate a comparison signal based on at least information associated with the first signal and the second signal. The first signal is associated with at least an output current of a power converter. Additionally, the system includes a pulse-width-modulation generator configured to receive at least the comparison signal and generate a modulation signal based on at least information associated with the comparison signal, and a driver component configured to receive the modulation signal and output a drive signal to a switch to adjust a primary current flowing through a primary winding of the power converter. The modulation signal is associated with a modulation frequency corresponding to a modulation period. The modulation frequency increases with the output current at a first slope within a first current range, the modulation frequency increases with the output current at a second slope within a second current range, and the modulation frequency increases with the output current at a third slope within a third current range. The first current range and the third current range are separated by at least the second current range, and each of the first slope, the second slope, and the third slope is larger than zero. The primary current is associated with a peak magnitude for each modulation period. The peak magnitude remains constant or increases with respect to the output current at a fourth slope within a fourth current range, and the fourth slope is equal to or larger than zero. The peak magnitude increases with the output current at a fifth slope within a fifth current range, and the fifth slope is larger than zero. The peak magnitude remains constant or increases with respect to the output current at a sixth slope within a sixth current range, and the sixth slope is equal to or larger than zero. The fourth current range and the sixth current range are separated by at least the fifth current range.

According to another embodiment, a method for regulating a power converter includes receiving a first signal and a second signal. The first signal is associated with at least an output current of a power converter. Additionally, the method includes processing information associated with the first signal and the second signal, generating a comparison signal based on at least information associated with the first signal and the second signal, receiving at least the comparison signal, and generating a modulation signal based on at least information associated with the comparison signal. Moreover, the method includes receiving the modulation signal, and outputting a drive signal based on at least at least information associated with the modulation signal to adjust a primary current flowing through a primary winding of the power converter. The modulation signal is associated with a modulation frequency corresponding to a modulation period. The modulation frequency increases with the output current at a first slope within a first current range, the modulation frequency increases with the output current at a second slope within a second current range, and the modulation frequency increases with the output current at a third slope within a third current range. The first current range and the third current range are separated by at least the second current range, and each of the first slope, the second slope, and the third slope is larger than zero. The primary current is associated with a peak magnitude for each modulation period. The peak magnitude remains constant or increases with respect to the output current at a fourth slope within a fourth current range, and the fourth slope is equal to or larger than zero. The peak magnitude increases with the output current at a fifth slope within a fifth current range, and the fifth slope is larger than zero. The peak magnitude remains constant or increases with respect to the output current at a sixth slope within a sixth current range, and the sixth slope is equal to or larger than zero. The fourth current range and the sixth current range are separated by at least the fifth current range.

According to yet another embodiment, a system for regulating a power converter includes a first comparator configured to receive a first signal and a second signal and generate a first comparison signal based on at least information associated with the first signal and the second signal. The first signal is associated with at least an output current of a power converter. Additionally, the system includes a second comparator configured to receive a third signal and a fourth signal and generate a second comparison signal based on at least information associated with the third signal and the fourth signal. The third signal is related to the second signal, and the fourth signal is associated with a primary current flowing through a primary winding of the power converter. Moreover, the system includes a logic component configured to receive at least the second comparison signal and generate a logic signal based on at least information associated with the second comparison signal, a pulse-width-modulation generator configured to receive at least the first comparison signal and the logic signal and generate a modulation signal based on at least information associated with the first comparison signal and the logic signal, and a driver component configured to receive the modulation signal and output a drive signal to a switch to adjust the primary current.

According to yet another embodiment, a method for regulating a power converter includes receiving a first signal and a second signal, and the first signal is associated with at least an output current of a power converter. Additionally, the method includes processing information associated with the first signal and the second signal, generating a first comparison signal based on at least information associated with the first signal and the second signal, and receiving a third signal and a fourth signal, the third signal being related to the second signal. The fourth signal is associated with a primary current flowing through a primary winding of the power converter. Moreover, the method includes processing information associated with the third signal and the fourth signal, generating a second comparison signal based on at least information associated with the third signal and the fourth signal, receiving at least the second comparison signal, processing information associated with the second comparison signal, and generating a logic signal based on at least information associated with the second comparison signal. Also, the method includes receiving at least the first comparison signal and the logic signal, generating a modulation signal based on at least information associated with the first comparison signal and the logic signal, receiving the modulation signal, and outputting a drive signal based on at least information associated with the modulation signal to adjust the primary current.

According to yet another embodiment, a system for regulating a power converter includes a first comparator configured to receive a first signal and a second signal and generate a first comparison signal based on at least information associated with the first signal and the second signal, and the first signal is associated with at least an output current of a power converter. Additionally, the system includes a second comparator configured to receive a third signal and a fourth signal and generate a second comparison signal based on at least information associated with the third signal and the fourth signal. The third signal is related to the second signal, and the fourth signal is associated with a primary current flowing through a primary winding of the power converter. Moreover, the system includes a logic component configured to receive at least the second comparison signal and generate a logic signal based on at least information associated with the second comparison signal, and a pulse-width-modulation generator configured to receive at least the first comparison signal and the logic signal and generate a modulation signal based on at least information associated with the first comparison signal and the logic signal. The modulation signal is associated with a modulation frequency. Also, the system includes a driver component configured to receive the modulation signal and output a drive signal to a switch to adjust the primary current. Also, the system includes a first current generator configured to receive the modulation signal and output a compensation current based on at least information associated with the modulation frequency to generate a compensation voltage and adjust the first signal, and a second current generator configured to receive the modulation signal associated with the modulation frequency and output an offset current based on at least information associated with the modulation frequency to generate an offset voltage and adjust the fourth signal.

According to yet another embodiment, a method for regulating a power converter includes receiving a first signal and a second signal. The first signal is associated with at least an output current of a power converter. Additionally, the method includes processing information associated with the first signal and the second signal, generating a first comparison signal based on at least information associated with the first signal and the second signal, and receiving a third signal and a fourth signal, the third signal being related to the second signal. The fourth signal is associated with a primary current flowing through a primary winding of the power converter. Moreover, the method includes processing information associated with the third signal and the fourth signal, generating a second comparison signal based on at least information associated with the third signal and the fourth signal, receiving at least the second comparison signal, processing information associated with the second comparison signal, and generating a logic signal based on at least information associated with the second comparison signal. Also, the method includes receiving at least the first comparison signal and the logic signal, and generating a modulation signal based on at least information associated with the first comparison signal and the logic signal. The modulation signal is associated with a modulation frequency. Additionally, the method includes receiving the modulation signal, outputting a drive signal based on at least information associated with the modulation signal to adjust the primary current, outputting a compensation current based on at least information associated with the modulation frequency to generate a compensation voltage and adjust the first signal, and outputting an offset current based on at least information associated with the modulation frequency to generate an offset voltage and adjust the fourth signal.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides switching frequency and peak current adjustments in response to loading changes. Merely by way of example, the invention has been applied to a flyback power converter. But it would be recognized that the invention has a much broader range of applicability.

Figure 1:
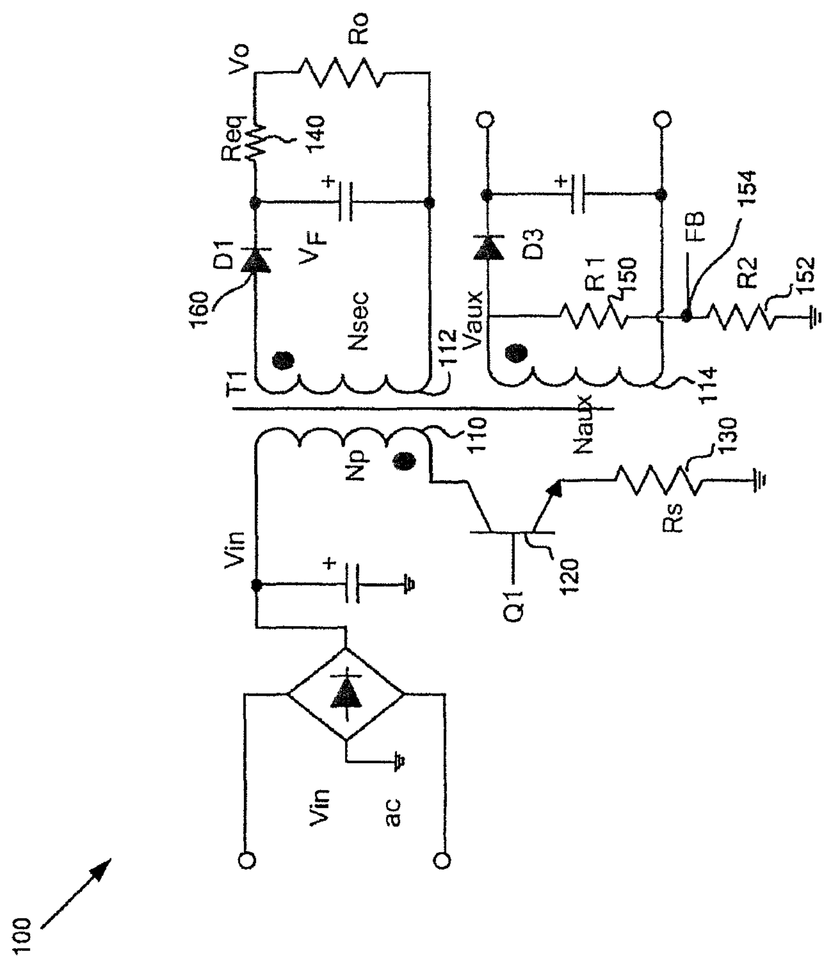
FIG. 1 is a simplified diagram showing a conventional flyback power conversion system with primary-side sensing and regulation.
Figure 2:
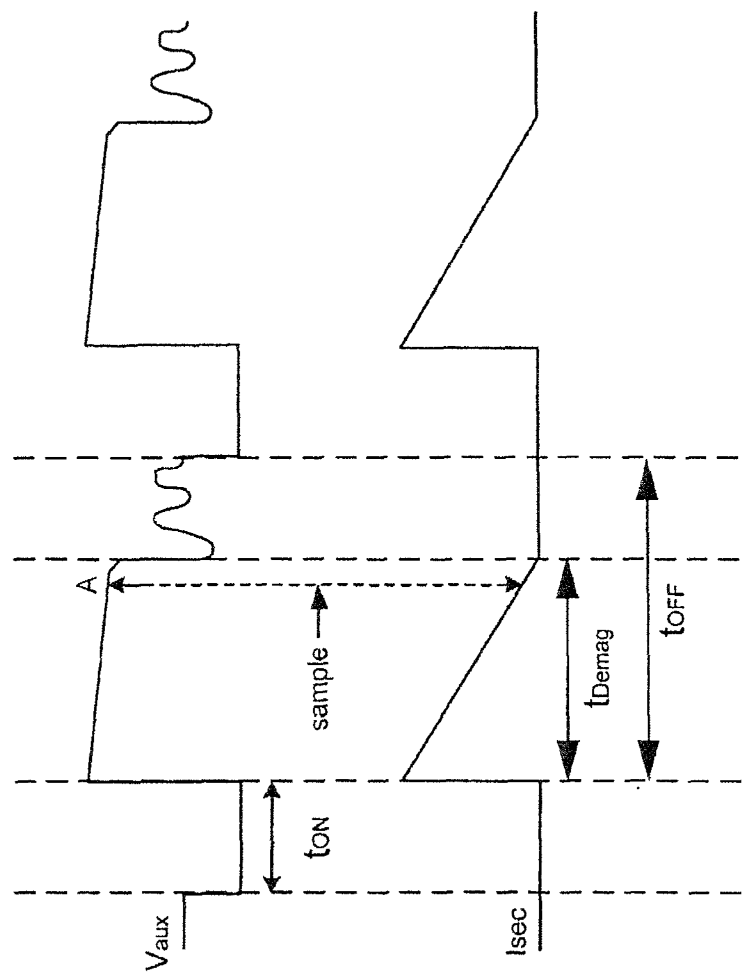
FIG. 2 is a simplified diagram showing a conventional operation mechanism for the flyback power conversion system 100.

Referring to FIGS. 1 and 2, information about the output voltage of the power conversion system 100 often is sampled only once every switching period. The switching period is inversely proportional to the switching frequency, which usually is set low at no load or light load conditions to reduce power consumption. But the low switching frequency often leads to poor dynamic response for the power conversion system 100 if the load changes from no load or light load to full load. For example, if the switching frequency is several hundred Hz at no load or light load conditions, information about the output voltage of the power conversion system 100 is sampled once every several msec. If the load changes from no load or light load to full load (e.g., the output current changing to 1 A at full load), the output voltage may drop below an acceptable level, because the controller does not respond until the next sampling is performed after, for example, several msec. One way to solve this problem is to increase the switching frequency at no load or light load conditions. But if the switching frequency is increased, the peak current of the primary winding at no load or light load conditions should be limited such that the output voltage does not exceed an acceptable level.

Figures 3A, 3B:
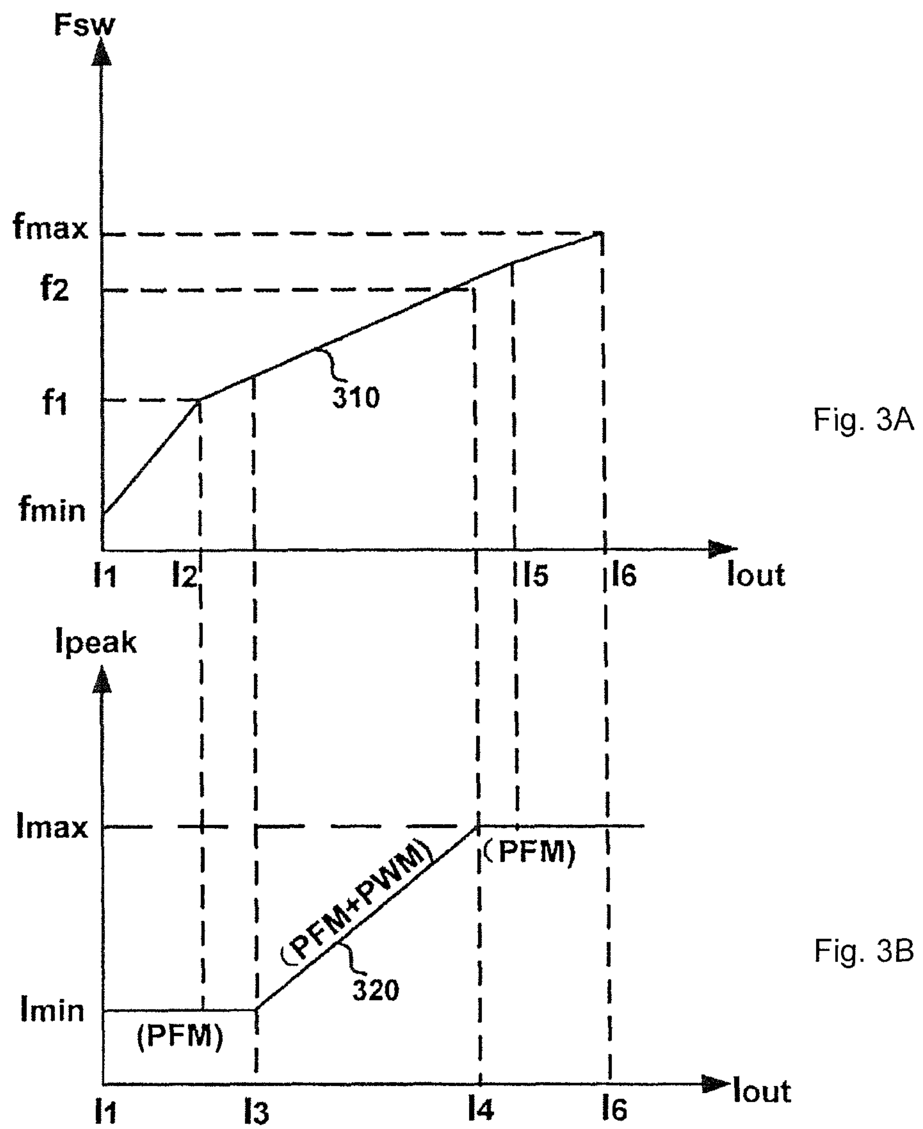
FIG. 3A and FIG. 3B are simplified diagrams showing switching frequency and peak current as functions of output current of a power conversion system in the constant-voltage (CV) mode according to an embodiment of the present invention.

FIG. 3A and FIG. 3B are simplified diagrams showing switching frequency and peak current as functions of output current of a power conversion system in the constant-voltage (CV) mode according to an embodiment of the present invention. These diagrams are merely examples, which should not unduly limit the scope of the claims. One of ordinary skill in the art would recognize many variations, alternatives, and modifications. The curve 310 represents the switching frequency (e.g., $F_{sw}$) as a function of output current (e.g., $I_{out}$), and the curve 320 represents the peak current (e.g., $I_{peak}$) for the primary winding as a function of output current (e.g., $I_{out}$). For example, if $I_{out}=I_1$, the power conversion system is at no load conditions, and if $I_{out}=I_6$, the power conversion system is at full load conditions. In another example, $I_1<I_2<I_3<I_4<I_5<I_6$.

As shown in FIG. 3A, the switching frequency (e.g., $F_{sw}$) changes with the output current (e.g., $I_{out}$) at a slope $S_{1f}$ if $I_1 \le I_{out}<I_2$, at a slope $S_{2f}$ if $I_2 \le I_{out}<I_5$, and at a slope $S_{3f}$ if $I_5 \le I_{out}<I_6$ according to one embodiment. For example, each of the slopes $S_{1f}$, $S_{2f}$, and $S_{3f}$ is larger than zero.

As shown in FIG. 3B, the peak current (e.g., $I_{peak}$) for each switching period (e.g., $T_{sw}$) changes with the output current (e.g., $I_{out}$) at a slope $S_{1p}$ if $I_1 \le I_{out}<I_3$, at a slope $S_{2p}$ if $I_3 \le I_{out}<I_4$, and at a slope $S_{3p}$ if $I_4 \le I_{out}<I_6$ according to another embodiment. For example, the slopes $S_{1p}$ and $S_{3p}$ each are equal to or larger than zero. In another example, the slope $S_{2p}$ is larger than zero. According to yet another embodiment, the power conversion system operates with pulse-frequency modulation for $I_1 \le I_{out}<I_3$, with both pulse-frequency modulation and pulse-width modulation for $I_3 \le I_{out}<I_4$, and with pulse-frequency modulation for $I_4 \le I_{out}<I_6$. For example, the slopes $S_{1p}$ and $S_{3p}$ each are equal to zero, and the peak current (e.g., $I_{peak}$) increases from $I_{min}$ to $I_{max}$ at the slope $S_{2p}$.

Figure 4:
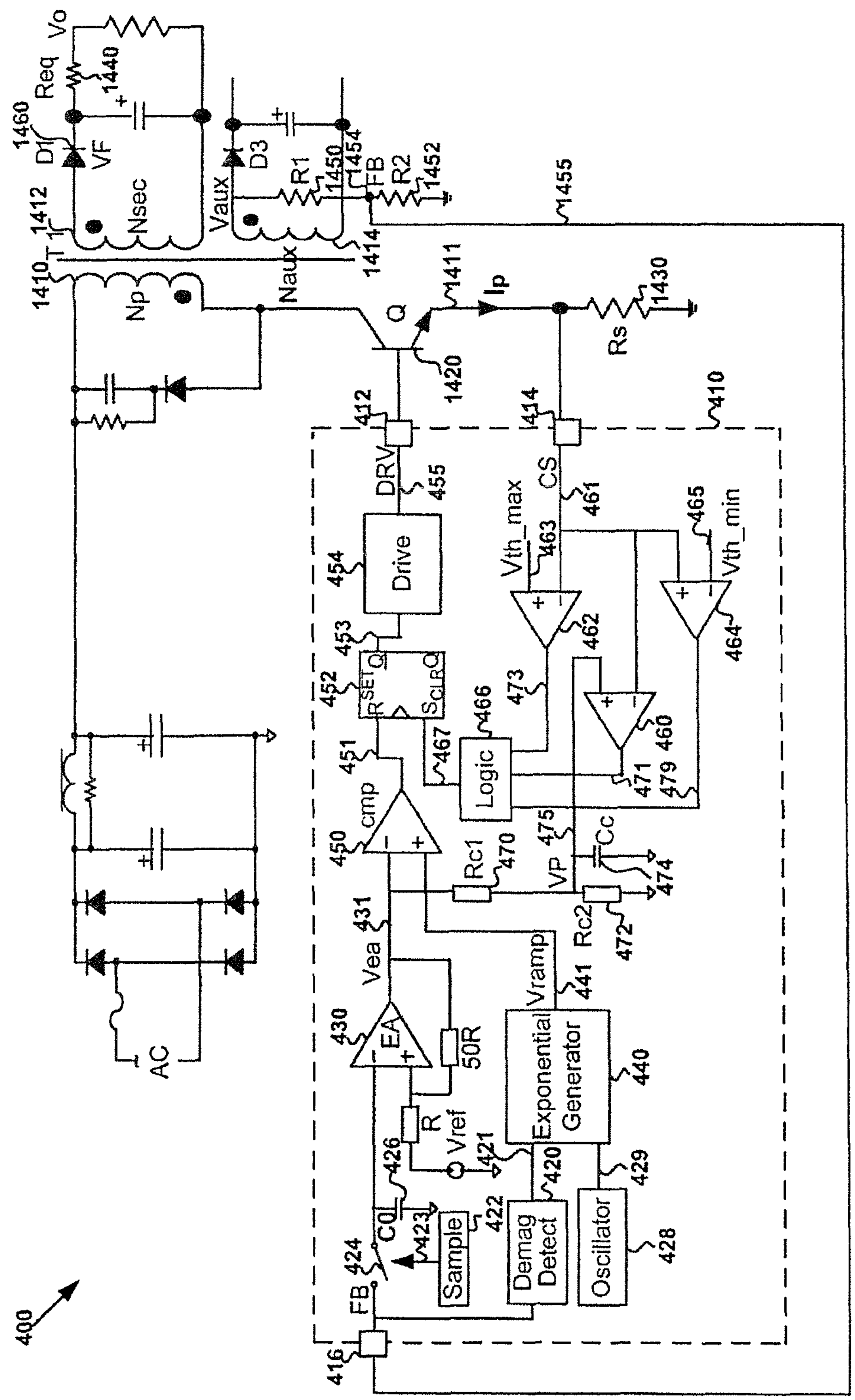
FIG. 4 is a simplified diagram showing a power conversion system that adjusts switching frequency and peak current in response to output current according to an embodiment of the present invention.

FIG. 4 is a simplified diagram showing a power conversion system that adjusts switching frequency and peak current in response to output current according to an embodiment of the present invention. This diagram is merely an example, which should not unduly limit the scope of the claims. One of ordinary skill in the art would recognize many variations, alternatives, and modifications.

The power conversion system 400 includes a primary winding 1410, a secondary winding 1412, an auxiliary winding 1414, a switch 1420 (e.g., a bipolar transistor), a current sensing resistor 1430, an equivalent resistor 1440 for an output cable, resistors 1450 and 1452, and a rectifying diode 1460. Additionally, the power conversion system 400 also includes a demagnetization detector 420, a sampling controller 422, a sampling switch 424, a capacitor 426, an oscillator 428, an error amplifier 430, an exponential generator 440, a comparator 450, a flip-flop component 452, a gate driver 454, comparators 460, 462, and 464, a logic component 466, resistors 470 and 472, and a capacitor 474.

For example, the primary winding 1410, the secondary winding 1412, the auxiliary winding 1414, the switch 1420, the current sensing resistor 1430, the equivalent resistor 1440, the resistors 1450 and 1452, and the rectifying diode 1460 are the same as the primary winding 110, the secondary winding 112, the auxiliary winding 114, the switch 120, the current sensing resistor 130, the equivalent resistor 140, the resistors 150 and 152, and the rectifying diode 160, respectively. In another example, the demagnetization detector 420, the sampling controller 422, the sampling switch 424, the capacitor 426, the oscillator 428, the error amplifier 430, the exponential generator 440, the comparator 450, the flip-flop component 452, the gate driver 454, the comparators 460, 462, and 464, the logic component 466, the resistors 470 and 472, and the capacitor 474 are located on a chip 410. In yet another example, the chip 410 includes terminals 412, 414, and 416.

Figure 5:
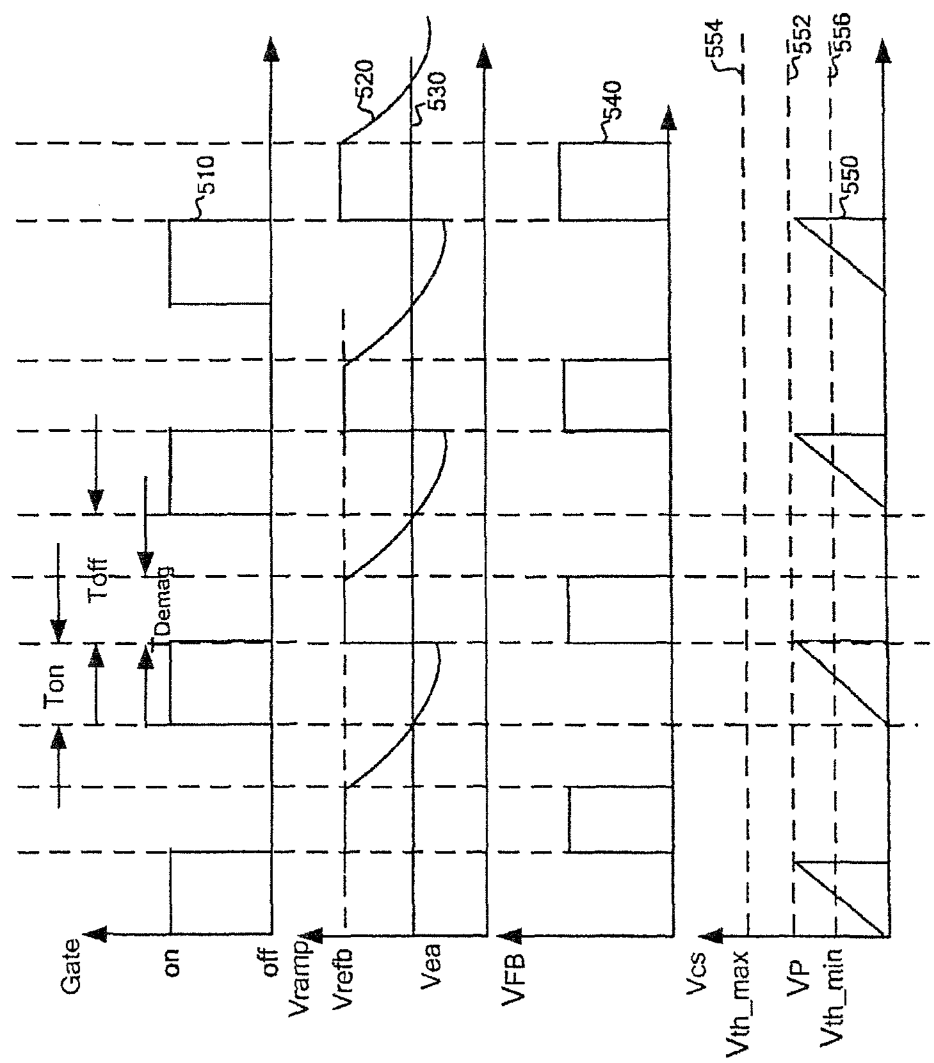
FIG. 5 is a simplified timing diagram for the switch-mode power conversion system 400 with constant voltage control according to an embodiment of the present invention.

FIG. 5 is a simplified timing diagram for the switch-mode power conversion system 400 with constant voltage control according to an embodiment of the present invention. This diagram is merely an example, which should not unduly limit the scope of the claims. One of ordinary skill in the art would recognize many variations, alternatives, and modifications.

As shown in FIG. 5, the waveform 510 represents turned-on and turned-off conditions of the switch 1420 as a function of time, the waveform 520 represents a ramping signal (e.g., $V_{ramp}$) as a function of time, the waveform 530 represents an amplified signal 431 (e.g., $V_{ea}$) as a function of time, and the waveform 540 represents a feedback signal 1455 as a function of time. Additionally, the waveform 550 represents a sensed signal 461 (e.g., $V_{cs}$) as a function of time, the waveform 552 represents a control signal 475 (e.g., $V_p$) as a function of time, and the waveform 554 represents a threshold signal 473 (e.g., $V_{th\_max}$) as a function of time.

As shown in FIGS. 4 and 5, information about the output voltage is extracted through the auxiliary winding 1414 according to one embodiment. For example, the auxiliary winding 1414, together with the resistors 1450 and 1452, generates the feedback signal 1455 (e.g., $V_{FB}$ corresponding to the waveform 540) at a node 1454. In another example, the feedback signal 1455 (e.g., $V_{FB}$) is received by at least the demagnetization detector 420 and the sampling switch 424.

In response, the demagnetization detector 420 outputs a signal 421 to the exponential generator 440 according to one embodiment. For example, the oscillator 428 also outputs a clock signal 429 to the exponential generator 440. In another example, the exponential generator 440 generates the ramping signal 441 (e.g., $V_{ramp}$ corresponding to the waveform 520) as follows:

$$V_{ramp}(n) = (V_{refb} - V_{refa}) \times e^{-\left(\frac{n \times T}{\tau}\right)} + V_{refa} \qquad \text{(Equation 5)}$$

where $V_{ramp}$ represents the voltage magnitude of the ramping signal 441. Additionally, $V_{refa}$ and $V_{refb}$ each represent a constant voltage level. For example, $V_{refa}$ equals 1V, and $V_{refb}$ equals 3V. Moreover, n represents the time for the ramping signal 441 to fall from $V_{refb}$ since the last reset of the ramping signal 441 in terms of the number of the clock periods. T is the clock period of the clock signal 429. Furthermore, $\tau$ is the time constant. Specifically, if $0 \le n \le 64$, $\tau = 128 \times T$; if $64 < n \le 128$, $\tau = 256 \times T$; if $128 < n \le 256$, $\tau = 512 \times T$; and if $256 < n \le 512$, $\tau = 1024 \times T$.

In one embodiment, when the switch 1420 is turned off, the energy stored in the transformer is released to the output terminal. For example, the demagnetization process starts, and the current flowing through the secondary winding 1412 ramps down linearly. For example, when the demagnetization process almost ends and the current flowing through the secondary winding 1412 approaches zero, a sampling signal 423 is generated by the sampling controller 422 to sample the feedback signal 1455 (e.g., $V_{FB}$ corresponding to the waveform 540) by closing the sampling switch 424. In another example, after the sampling process is completed, the sampling switch 424 is open in response to the sampling signal 423. In yet another example, the sampled voltage is held on the capacitor 426, and compared with a reference voltage $V_{ref}$, such as 2V.

The difference between the sampled/held voltage and the reference voltage $V_{ref}$ is amplified by the error amplifier 430 to generate the amplified signal 431 (e.g., $V_{ea}$ correspond to the waveform 530) according to an embodiment. According to another embodiment, the amplified signal 431 is received by the resistor 470 and the negative input terminal of the comparator 450. For example, the resistor 470, together with the resistor 472 and the capacitor 474, outputs the control signal 475 (e.g., $V_p$ corresponding to the waveform 552) to the comparator 460. In another example, the resistors 470 and 472 and the capacitor 474 form a compensation network, which perform attenuation and low-pass filtering to the amplified signal 431 and generates the control signal 475. In yet another example, the comparator 450 also receives the ramping signal 441 (e.g., $V_{ramp}$ corresponding to the waveform 520) at the positive input terminal, and in response sends an output signal 451 to the flip-flop component 452.

As shown in FIG. 5, when the demagnetization process starts, the ramping signal 441 (e.g., $V_{ramp}$ corresponding to the waveform 520) is restored to an initial value (e.g., $V_{refb}$), but after the demagnetization process is completed, the ramping signal 441 decreases exponentially according to one embodiment. In another embodiment, if the ramping signal 441 becomes smaller than the amplified signal 431 (e.g., $V_{ea}$ corresponding to the waveform 530) in magnitude, the comparison signal 451 changes to the logic low level, causing the signal 453 to change to the logic high level and causing the switch 1420 to be turned on.

In another embodiment, a primary current 1411 that flows through the primary winding 1410 is sensed by the current sensing resistor 1430, which in response outputs the sensed signal 461 (e.g., $V_{cs}$ corresponding to the waveform 550) to the comparators 460, 462, and 464. For example, if the switch 1420 is closed (e.g., being turned on), the transformer stores energy and the primary current 1411 ramps up linearly, causing the sensed signal 461 (e.g., $V_{cs}$) to also ramp up linearly. In another example, the positive terminal of the comparator 460 receives the control signal 475 (e.g., $V_p$ corresponding to the waveform 552), and the negative terminal of the comparator 460 receives the sensed signal 461. In another example, the positive terminal of the comparator 462 receives the threshold signal 463 (e.g., $V_{th\_max}$ corresponding to the waveform 554), and the negative terminal of the comparator 462 receives the sensed signal 461. In yet another example, the positive terminal of the comparator 464 receives the sensed signal 461, and the negative terminal of the comparator 464 receives a threshold signal 465 (e.g., $V_{th\_min}$ which is smaller than $V_{th\_max}$ in magnitude).

In yet another embodiment, the comparators 460, 462, and 464 generate comparison signals 471, 473, and 479 respectively, all of which are received by the logic component 466. For example, the logic component 466 in response generates a logic signal 467.

According to one embodiment, the flip-flop component 452 receives the comparison signal 451 and the logic signal 467, and in response generates a signal 453. For example, as shown in FIG. 5, if the comparison signal 451 is at the logic low level but the logic signal 467 is at the logic high level, the signal 453 is at the logic high level, and if the comparison signal 451 is at the logic low level and the logic signal 467 is also at the logic low level, the signal 453 is at the logic low level. In another example, if the logic signal 467 is at the logic low level, the signal 453 from the $\overline{Q}$ terminal is also at the logic low level in order to turn off the switch 1420, regardless of whether the comparison signal 451 is at the logic high level or at the logic low level. In yet another example, if the logic signal 467 is at the logic high level and the comparison signal 451 is at the logic low level, the signal 453 is at the logic high level to turn on the switch 1420.

According to another embodiment, the signal 453 is received by the gate driver 454, which outputs a drive signal 455 to the switch 1420 through the terminal 412 (e.g., outputting the base current 455 to the bipolar transistor 1420 through the terminal 412). For example, if the signal 453 is at the logic high level, the drive signal 455 causes the switch 1420 to be closed (e.g., being turned on as shown by the waveform 510). In another example, if the signal 453 is at the logic low level, the drive signal 455 causes the switch 1420 to be open (e.g., being turned off as shown by the waveform 510).

As shown in FIGS. 4 and 5, the larger the output loading (e.g., the output current) is, the larger the amplified signal 431 (e.g., $V_{ea}$ corresponding to the waveform 530) becomes, causing the off-time (e.g., $T_{off}$) of the switch 1420 to become shorter and the switching frequency (e.g., $F_{sw}$) to become higher according to one embodiment. According to another embodiment, the smaller the output loading (e.g., the output current) is, the smaller the amplified signal 431 (e.g., $V_{ea}$ corresponding to the waveform 530) becomes, causing the off-time (e.g., $T_{off}$) of the switch 1420 to become longer and the switching frequency (e.g., $F_{sw}$) to become lower as shown in FIG. 3A.

According to yet another embodiment, the logic component 466 includes an OR gate and other components. For example, if the control signal 475 (e.g. $V_p$) is smaller than the threshold signal 465 (e.g., $V_{th\_min}$) in magnitude, the peak magnitude of the sensed signal 461 (e.g., $V_{cs}$ corresponding the waveform 550) is limited to the magnitude of the threshold signal 465 (e.g., $V_{th\_min}$ corresponding to the waveform 556), and the on-time of the switch 1420 (e.g., $T_{on}$) and the peak magnitude of the primary current 1411 remains constant regardless of the output loading (e.g., the output current) as shown for $I_1 \leq I_{out} < I_3$ in FIG. 3B.

In another example, if the control signal 475 (e.g., $V_p$) is larger than the threshold signal 465 (e.g., $V_{th\_min}$) but smaller than the threshold signal 463 (e.g., $V_{th\_max}$) in magnitude, the peak magnitude of the sensed signal 461 (e.g., $V_{cs}$ corresponding the waveform 550) is limited to the magnitude of the control signal 475 (e.g., $V_p$ corresponding to the waveform 552). For example, the control signal 475 (e.g., $V_p$) increases with the output loading (e.g., the output current) in magnitude; hence both the on-time of the switch 1420 (e.g., $T_{on}$) and the peak magnitude of the primary current 1411 increases with the output loading (e.g., the output current) as shown for $I_3 \leq I_{out} < I_4$ in FIG. 3B.

In yet another example, if the control signal 475 (e.g., $V_p$) becomes larger than the threshold signal 463 (e.g., $V_{th\_max}$) in magnitude, the peak magnitude of the sensed signal 461 (e.g., $V_{cs}$ corresponding the waveform 550) is limited to the magnitude of the threshold signal 463 (e.g., $V_{th\_max}$ corresponding to the waveform 554). For example, both the on-time of the switch 1420 (e.g., $T_{on}$) and the peak magnitude of the primary current 1411 remains constant regardless of the output loading (e.g., the output current) as shown for $I_4 \leq out < I_6$ in FIG. 3B.

As discussed above and further emphasized here, FIG. 4 is merely an example, which should not unduly limit the scope of the claims. One of ordinary skill in the art would recognize many variations, alternatives, and modifications. For example, the bipolar transistor 1420 is replaced by a MOS transistor as shown in FIG. 6.

Figure 6:
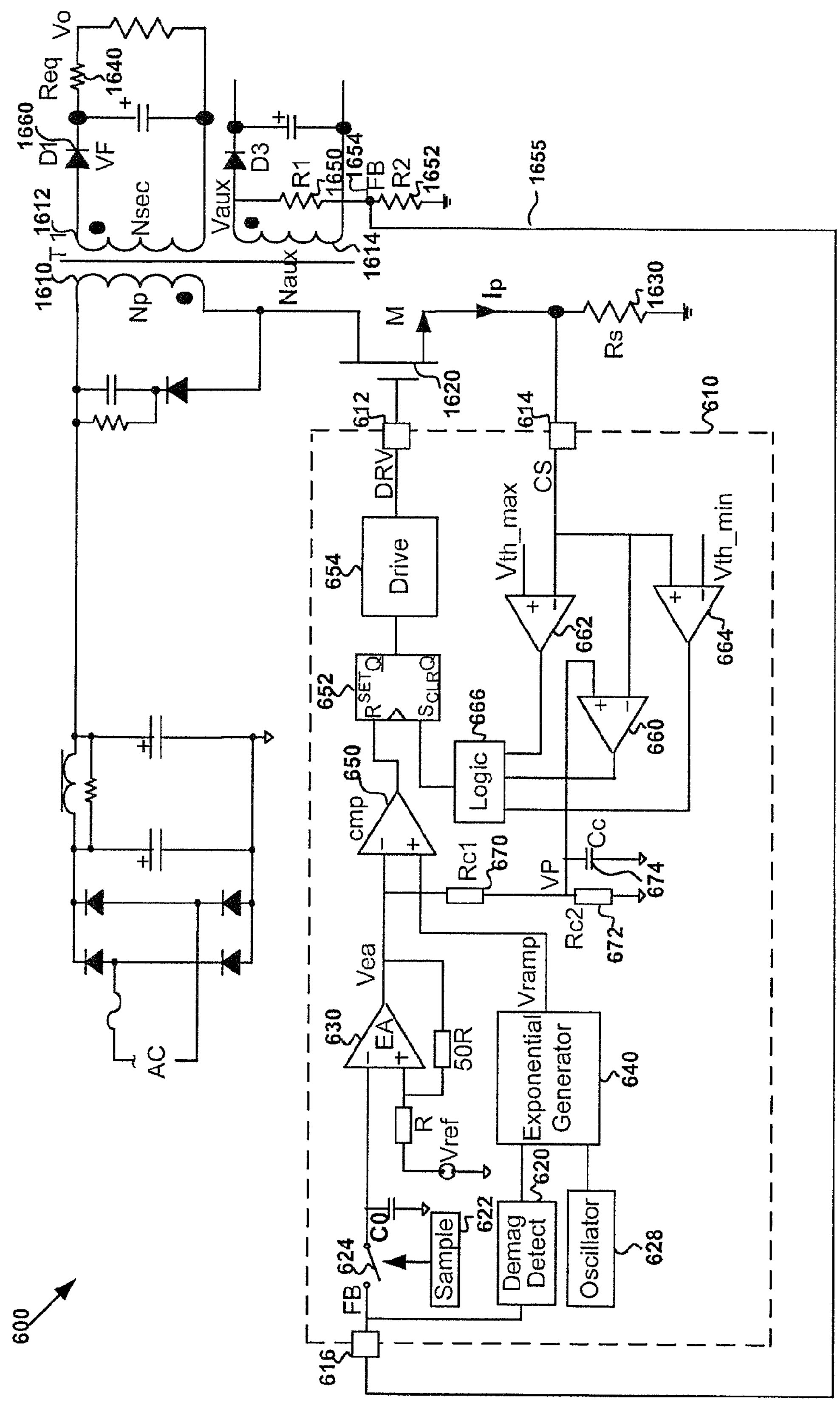
FIG. 6 is a simplified diagram showing a power conversion system that adjusts switching frequency and peak current in response to output current according to another embodiment of the present invention.

FIG. 6 is a simplified diagram showing a power conversion system that adjusts switching frequency and peak current in response to output current according to another embodiment of the present invention. This diagram is merely an example, which should not unduly limit the scope of the claims. One of ordinary skill in the art would recognize many variations, alternatives, and modifications.

The power conversion system 600 includes a primary winding 1610, a secondary winding 1612, an auxiliary winding 1614, a switch 1620 (e.g., a MOS transistor), a current sensing resistor 1630, an equivalent resistor 1640 for an output cable, resistors 1650 and 1652, and a rectifying diode 1660. Additionally, the power conversion system 600 also includes a demagnetization detector 620, a sampling controller 622, a sampling switch 624, a capacitor 626, an oscillator 628, an error amplifier 630, an exponential generator 640, a comparator 650, a flip-flop component 652, a gate driver 654, comparators 660, 662, and 664, a logic component 666, resistors 670 and 672, and a capacitor 674.

For example, the primary winding 1610, the secondary winding 1612, the auxiliary winding 1614, the switch 1620, the current sensing resistor 1630, the equivalent resistor 1640, the resistors 1650 and 1652, and the rectifying diode 1660 are the same as the primary winding 110, the secondary winding 112, the auxiliary winding 114, the switch 120, the current sensing resistor 130, the equivalent resistor 140, the resistors 150 and 152, and the rectifying diode 160, respectively. In another example, the demagnetization detector 620, the sampling controller 622, the sampling switch 624, the capacitor 626, the oscillator 628, the error amplifier 630, the exponential generator 640, the comparator 650, the flip-flop component 652, the gate driver 654, the comparators 660, 662, and 664, the logic component 666, the resistors 670 and 672, and the capacitor 674 are located on a chip 610. In yet another example, the chip 610 includes terminals 612, 614, and 616.

In yet another example, the demagnetization detector 620, the sampling controller 622, the sampling switch 624, the capacitor 626, the oscillator 628, the error amplifier 630, the exponential generator 640, the comparator 650, the flip-flop component 652, the gate driver 654, the comparators 660, 662, and 664, the logic component 666, the resistors 670 and 672, and the capacitor 674 are similar to the demagnetization detector 420, the sampling controller 422, the sampling switch 424, the capacitor 426, the oscillator 428, the error amplifier 430, the exponential generator 440, the comparator 450, the flip-flop component 452, the gate driver 454, the comparators 460, 462, and 464, the logic component 466, the resistors 470 and 472, and the capacitor 474, respectively, except that certain modifications are made in order to drive a MOS transistor instead of a bipolar transistor. In yet another example, the auxiliary winding 1614, together with the resistors 1650 and 1652, generates a feedback signal 1655 at a node 1654.

Figure 7:
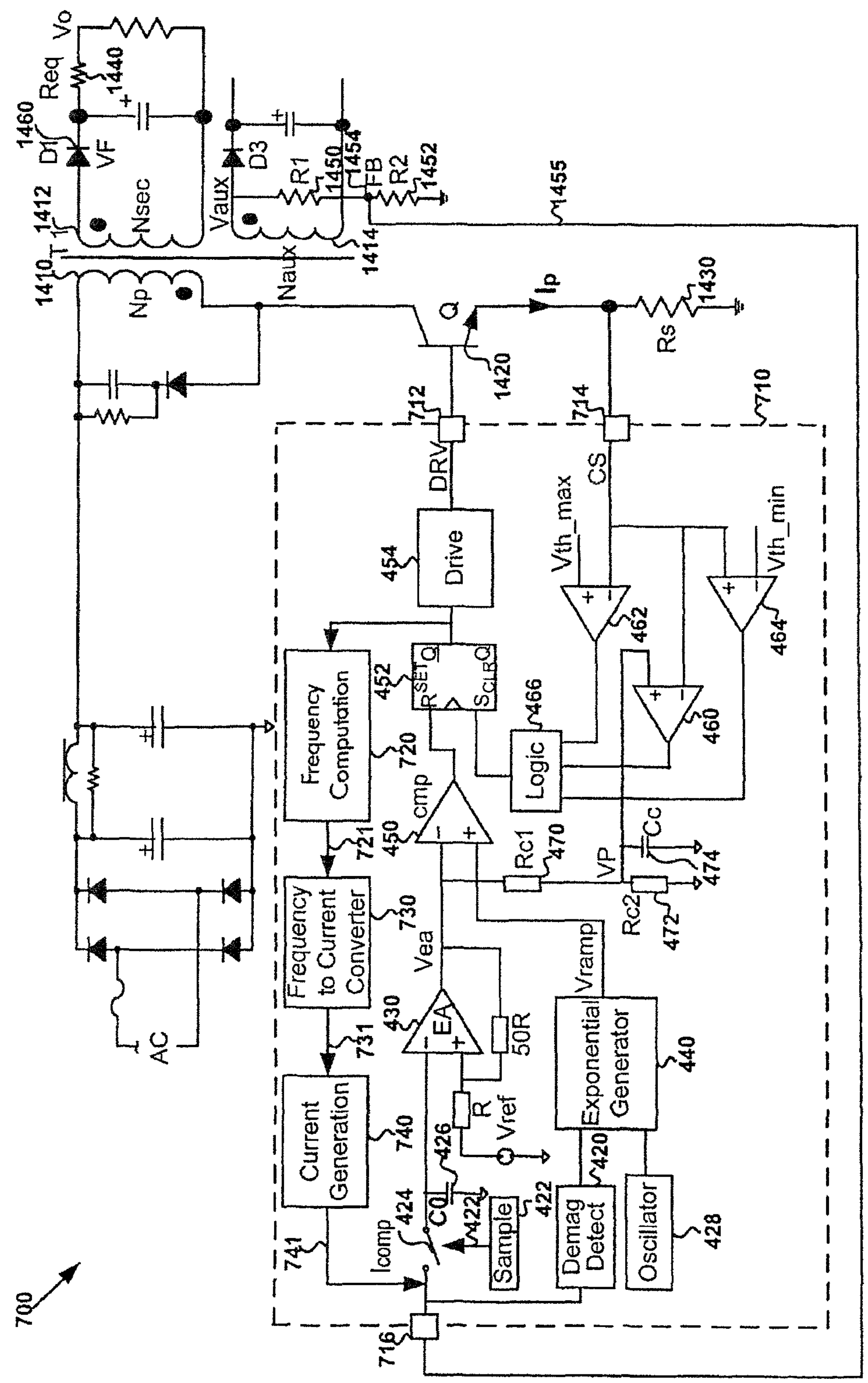
FIG. 7 is a simplified diagram showing a power conversion system that adjusts switching frequency and peak current in response to output current with voltage compensation according to yet another embodiment of the present invention.

FIG. 7 is a simplified diagram showing a power conversion system that adjusts switching frequency and peak current in response to output current with voltage compensation according to yet another embodiment of the present invention. This diagram is merely an example, which should not unduly limit the scope of the claims. One of ordinary skill in the art would recognize many variations, alternatives, and modifications.

The power conversion system 700 includes the primary winding 1410, the secondary winding 1412, the auxiliary winding 1414, the switch 1420 (e.g., a bipolar transistor), the current sensing resistor 1430, the equivalent resistor 1440 for the output cable, the resistors 1450 and 1452, and the rectifying diode 1460. Additionally, the power conversion system 700 also includes the demagnetization detector 420, the sampling controller 422, the sampling switch 424, the capacitor 426, the oscillator 428, the error amplifier 430, the exponential generator 440, the comparator 450, the flip-flop component 452, the gate driver 454, the comparators 460, 462, and 464, the logic component 466, the resistors 470 and 472, and the capacitor 474. Moreover, the power conversion system 700 also includes a frequency computation component 720, a frequency-to-current converter 730, and a current generation component 740.

For example, the demagnetization detector 420, the sampling controller 422, the sampling switch 424, the capacitor 426, the oscillator 428, the error amplifier 430, the exponential generator 440, the comparator 450, the flip-flop component 452, the gate driver 454, the comparators 460, 462, and 464, the logic component 466, the resistors 470 and 472, the capacitor 474, the frequency computation component 720, the frequency-to-current converter 730, and the current generation component 740 are located on a chip 710. In another example, the chip 710 includes terminals 712, 714, and 716. In yet another example, the frequency computation component 720, the frequency-to-current converter 730, and the current generation component 740 are parts of a compensation current generator.

According to one embodiment, the switching frequency increases with the output loading (e.g., the output current) and thus reflects the magnitude of the output loading (e.g., the magnitude of the output current) for at least $I_2 \leq I_{out} < I_5$ as shown in FIG. 3A. For example, the frequency computation component 720 receives the output signal of the flip-flop component 452, which is also received by the gate driver 454, and generates a frequency signal 721 that represents the magnitude of the switching frequency. In another example, the frequency signal 721 is received by the frequency-to-current converter 730 and is converted to a current signal 731. In yet another example, the current generation component 740 receives the current signal 731 and in response generates a compensation current 741 (e.g., $I_{comp}$). In yet another example, the current generation component 740 also includes a low-pass filter to smooth out the compensation current 741 (e.g., $I_{comp}$).

According to another embodiment, the compensation current 741 (e.g., $I_{comp}$) flows out of the chip 710 through the terminal 716, and generates a compensation voltage as follows:

$$V_{comp} = \frac{R_1 \times R_2}{R_1 + R_2} \times I_{comp} \quad \text{(Equation 6)}$$

where $V_{comp}$ represents the compensation voltage, and $I_{comp}$ represents the compensation current 741. Additionally, $R_1$ and $R_2$ represent resistance values of the resistors 1450 and 1452, respectively. For example, the compensation voltage is used to compensate for the voltage-drop due to the output cable (which is represented by the equivalent resistor 1440), and is also compensated for the output-voltage error due to cross regulation of the secondary winding and the auxiliary winding at no load and light load conditions. In another example, the compensation voltage is used to adjust the feedback signal 1455.

Figure 8:
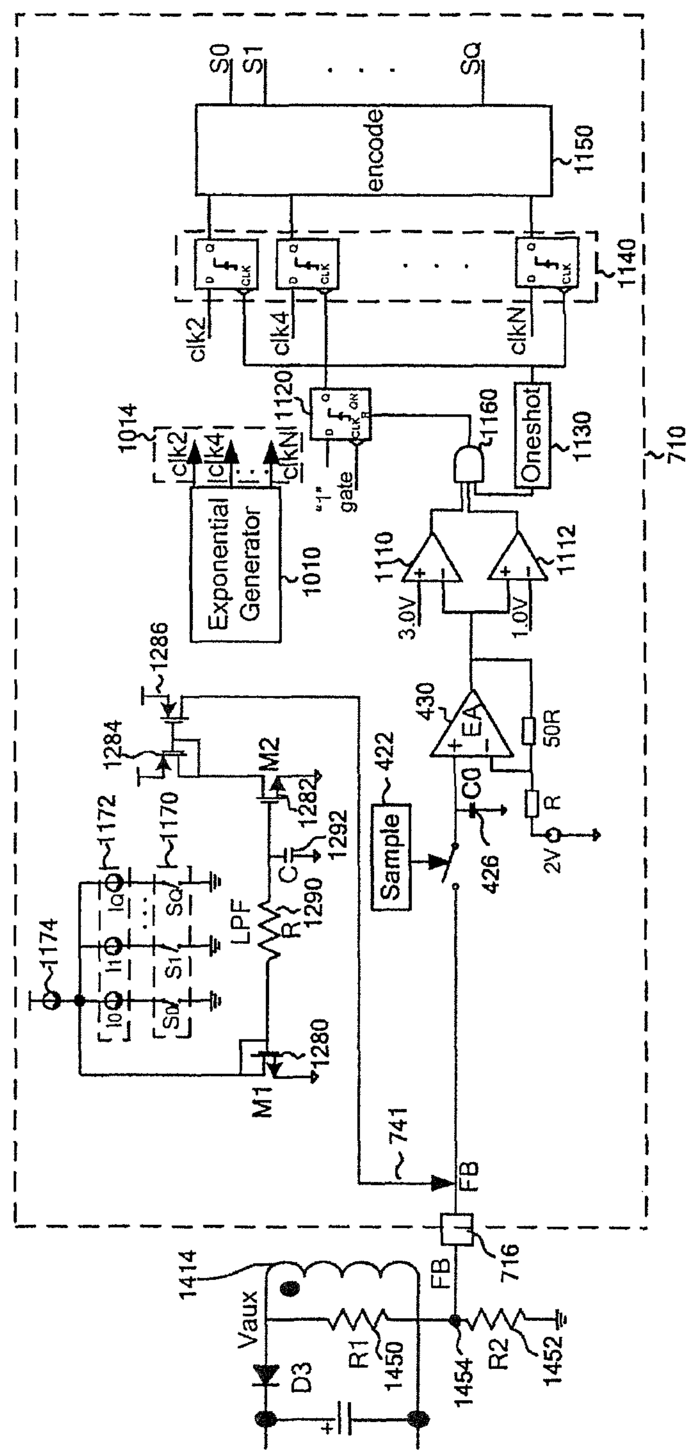
FIG. 8 is a simplified diagram showing a compensation current generator for the power conversion system 700 according to an embodiment of the present invention.

FIG. 8 is a simplified diagram showing a compensation current generator for the power conversion system 700 according to an embodiment of the present invention. This diagram is merely an example, which should not unduly limit the scope of the claims. One of ordinary skill in the art would recognize many variations, alternatives, and modifications.

The compensation current generator includes the comparators 1110 and 1112, the flip-flop component 1120, the signal generator 1130, the flip-flop components 1140, the encoding component 1150, the AND gate 1160, the switches 1170, the current sinks 1172, and the current source 1174. Additionally, the compensation current generator also includes transistors 1280, 1282, 1284, and 1286, a resistor 1290, and a capacitor 1292, an exponential generator 1010 and a frequency computation component 1014. U.S. patent application Ser. No. 12/859,138 is incorporated by reference herein for all purposes.

As shown in FIG. 8, the compensation current 741 that is dependent on the switching frequency is generated according to one embodiment. For example, since higher switching frequencies correspond to heavier loading conditions (e.g., larger output currents), and lower switching frequencies correspond to no load or light load conditions (e.g., smaller output currents); a larger compensation current is generated for lower switching frequency and a smaller compensation current is generated for higher switching frequency. In another example, the compensation current 741 is smoothed out by a low-pass filter that is formed by the resistor 1290 and the capacitor 1292. In yet another example, the compensation current 741 flows out of the chip 710 through the terminal 716, and together with the resistors 1450 and 1452 generates the compensation voltage (e.g., $V_{comp}$) that is superimposed with the feedback signal.

As discussed above and further emphasized here, FIG. 7 is merely an example, which should not unduly limit the scope of the claims. One of ordinary skill in the art would recognize many variations, alternatives, and modifications. For example, the bipolar transistor 1420 is replaced by a MOS transistor, and one or more components of the power conversion system 700 are modified in order to drive the MOS transistor instead of a bipolar transistor.

Figure 9:
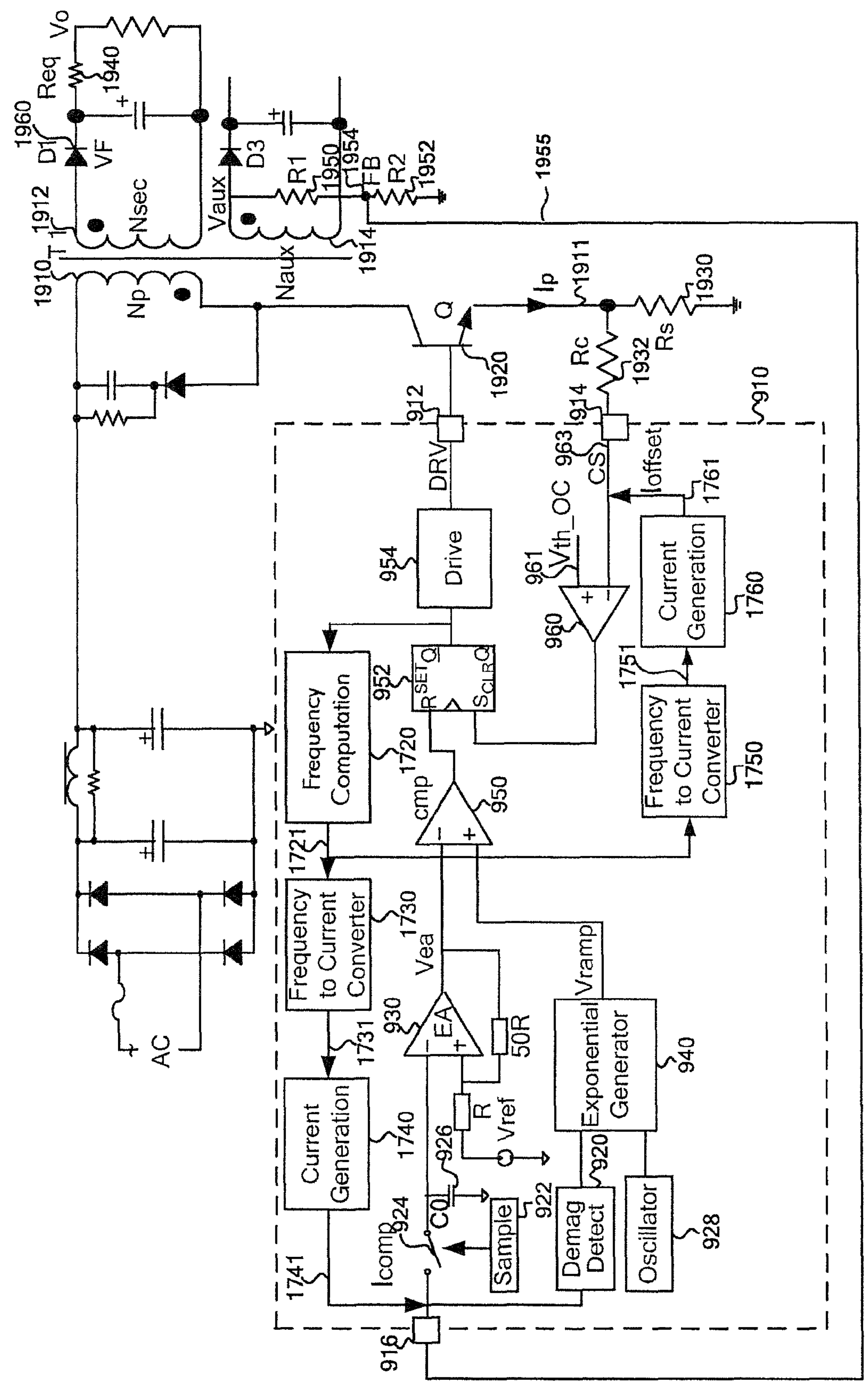
FIG. 9 is a simplified diagram showing a power conversion system that adjusts switching frequency and peak current in response to output current with offset modulation current according to yet another embodiment of the present invention.

FIG. 9 is a simplified diagram showing a power conversion system that adjusts switching frequency and peak current in response to output current with offset modulation current according to yet another embodiment of the present invention. This diagram is merely an example, which should not unduly limit the scope of the claims. One of ordinary skill in the art would recognize many variations, alternatives, and modifications.

The power conversion system 900 includes a primary winding 1910, a secondary winding 1912, an auxiliary winding 1914, a switch 1920 (e.g., a bipolar transistor), a current sensing resistor 1930, an equivalent resistor 1940 for an output cable, resistors 1950 and 1952, and a rectifying diode 1960. Additionally, the power conversion system 900 also includes the demagnetization detector 920, the sampling controller 922, the sampling switch 924, the capacitor 926, the oscillator 928, the error amplifier 930, the exponential generator 940, the comparator 950, the flip-flop component 952, and the gate driver 954. Moreover, the power conversion system 900 also includes a frequency computation component 1720, a frequency-to-current converter 1730, and a current generation component 1740. Also, the power conversion system 900 includes a comparator 960, a frequency-to-current converter 1750, a current generation component 1760, and a resistor 1932.

For example, the primary winding 1910, the secondary winding 1912, the auxiliary winding 1914, the switch 1920, the current sensing resistor 1930, the equivalent resistor 1940, the resistors 1950 and 1952, and the rectifying diode 1960 are the same as the primary winding 110, the secondary winding 112, the auxiliary winding 114, the switch 120, the current sensing resistor 130, the equivalent resistor 140, the resistors 150 and 152, and the rectifying diode 160, respectively. In another example, the demagnetization detector 920, the sampling controller 922, the sampling switch 924, the capacitor 926, the oscillator 928, the error amplifier 930, the exponential generator 940, the comparator 950, the flip-flop component 952, the gate driver 954, the frequency computation component 1720, the frequency-to-current converter 1730, the current generation component 1740, the comparator 960, the frequency-to-current converter 1750, and the current generation component 1760 are located on a chip 910. In another example, the auxiliary winding 1914, together with the resistors 1950 and 1952, generates a feedback signal 1955 at a node 1954. In another example, the chip 910 includes terminals 912, 914, and 916.

In yet another example, the demagnetization detector 920, the sampling controller 922, the sampling switch 924, the capacitor 926, the oscillator 928, the error amplifier 930, the exponential generator 940, the comparator 950, the flip-flop component 952, the gate driver 954, the frequency computation component 1720, the frequency-to-current converter 1730, and the current generation component 1740 are substantially the same as the demagnetization detector 420, the sampling controller 422, the sampling switch 424, the capacitor 426, the oscillator 428, the error amplifier 430, the exponential generator 440, the comparator 450, the flip-flop component 452, the gate driver 454, the frequency computation component 720, the frequency-to-current converter 730, and the current generation component 740, respectively.

According to one embodiment, the switching frequency increases with the output loading (e.g., the output current) and thus reflects the magnitude of the output loading (e.g., the magnitude of the output current) in at least region II of FIG. 3A. For example, the frequency computation component 1720 receives the output signal of the flip-flop component 952, which is also received by the gate driver 954, and generates a frequency signal 1721 that represents the magnitude of the switching frequency. In another example, the frequency signal 1721 is received by the frequency-to-current converters 1730 and 1750 and is converted to current signals 1731 and 1751, respectively.

As shown in FIG. 9, the current generation component 1740 receives the current signal 1731 and in response generates a compensation current 1741 (e.g., $I_{comp}$), and the current generation component 1760 receives the current signal 1751 and in response generates an offset modulation current 1761 (e.g., $I_{offset}$) according to one embodiment. For example, the offset modulation current 1761 (e.g., $I_{offset}$) decreases with increasing switching frequency and thus also decreases with increasing output loading (e.g., with increasing output current).

According to another embodiment, the offset modulation current 1761 (e.g., $I_{offset}$) flows out of the chip 910 through the terminal 914, and generates an offset voltage as follows:

$$V_{offset}=R_c\times I_{offset} \quad \text{(Equation 7)}$$

where $V_{offset}$ represents the offset voltage, and $I_{offset}$ represents the offset modulation current 1761. Additionally, Re represents the resistance value of the resistor 1932.

For example, the offset voltage is used to adjust a sensed signal 963 (e.g., $V_{cs}$). In another example, using Equation 7, the peak magnitude of a primary current 1911 that flows through the primary winding 1912 is determined as follows:

$$I_{peak}=\frac{V_{th\_OC}-R_c\times I_{offset}}{R_s} \quad \text{(Equation 8)}$$

where $I_{peak}$ represents the peak magnitude of the primary current 1911, and $V_{th\_OC}$ represents the threshold signal 961. Additionally, $R_c$ represents the resistance value of the resistor 1932. For example, the offset modulation current 1761 (e.g., $I_{offset}$) decreases with increasing output loading (e.g., with increasing output current); hence the peak magnitude of the primary current 1911 increases with increasing output loading (e.g., with increasing output current) but cannot exceed $V_{th\_OC}R_s$ according to Equation 8.

As shown in FIG. 9, the compensation current 1741 (e.g., $I_{comp}$) is generated by at least the frequency-to-current converter 1730 and the current generation component 1740, and the offset modulation current 1761 (e.g., $I_{offset}$) is generated by at least the frequency-to-current converter 1750 and the current generation component 1760 according to some embodiments. For example, the compensation current 1741 (e.g., $I_{comp}$) and the offset modulation current 1761 (e.g., $I_{offset}$) are different and separate, even though both the currents 1741 and 1761 are derived from the frequency signal 1721 that is generated by the frequency computation component 1720.

As discussed above and further emphasized here, FIG. 9 is merely an example, which should not unduly limit the scope of the claims. One of ordinary skill in the art would recognize many variations, alternatives, and modifications. For example, the bipolar transistor 1920 is replaced by a MOS transistor, and one or more components of the power conversion system 900 are modified in order to drive the MOS transistor instead of a bipolar transistor. In another example, the current generation components 1740 and 1760 each include a low-pass filter. In yet another example, the current generation components 1740 and 1760 share a low-pass filter that is used to smooth out both the compensation current 1741 (e.g., $I_{comp}$) and the offset modulation current 1761 (e.g., $I_{offset}$).

According to another embodiment, a system for regulating a power converter includes a comparator configured to receive a first signal and a second signal and generate a comparison signal based on at least information associated with the first signal and the second signal. The first signal is associated with at least an output current of a power converter. Additionally, the system includes a pulse-width-modulation generator configured to receive at least the comparison signal and generate a modulation signal based on at least information associated with the comparison signal, and a driver component configured to receive the modulation signal and output a drive signal to a switch to adjust a primary current flowing through a primary winding of the power converter. The modulation signal is associated with a modulation frequency corresponding to a modulation period. The modulation frequency increases with the output current at a first slope within a first current range, the modulation frequency increases with the output current at a second slope within a second current range, and the modulation frequency increases with the output current at a third slope within a third current range. The first current range and the third current range are separated by at least the second current range, and each of the first slope, the second slope, and the third slope is larger than zero. The primary current is associated with a peak magnitude for each modulation period. The peak magnitude remains constant or increases with respect to the output current at a fourth slope within a fourth current range, and the fourth slope is equal to or larger than zero. The peak magnitude increases with the output current at a fifth slope within a fifth current range, and the fifth slope is larger than zero. The peak magnitude remains constant or increases with respect to the output current at a sixth slope within a sixth current range, and the sixth slope is equal to or larger than zero. The fourth current range and the sixth current range are separated by at least the fifth current range. For example, the system is implemented according to FIG. 4, FIG. 6, FIG. 7, and/or FIG. 9.

According to another embodiment, a method for regulating a power converter includes receiving a first signal and a second signal. The first signal is associated with at least an output current of a power converter. Additionally, the method includes processing information associated with the first signal and the second signal, generating a comparison signal based on at least information associated with the first signal and the second signal, receiving at least the comparison signal, and generating a modulation signal based on at least information associated with the comparison signal. Moreover, the method includes receiving the modulation signal, and outputting a drive signal based on at least at least information associated with the modulation signal to adjust a primary current flowing through a primary winding of the power converter. The modulation signal is associated with a modulation frequency corresponding to a modulation period. The modulation frequency increases with the output current at a first slope within a first current range, the modulation frequency increases with the output current at a second slope within a second current range, and the modulation frequency increases with the output current at a third slope within a third current range. The first current range and the third current range are separated by at least the second current range, and each of the first slope, the second slope, and the third slope is larger than zero. The primary current is associated with a peak magnitude for each modulation period. The peak magnitude remains constant or increases with respect to the output current at a fourth slope within a fourth current range, and the fourth slope is equal to or larger than zero. The peak magnitude increases with the output current at a fifth slope within a fifth current range, and the fifth slope is larger than zero. The peak magnitude remains constant or increases with respect to the output current at a sixth slope within a sixth current range, and the sixth slope is equal to or larger than zero. The fourth current range and the sixth current range are separated by at least the fifth current range. For example, the method is implemented according to FIG. 4, FIG. 6, FIG. 7, and/or FIG. 9.

According to yet another embodiment, a system for regulating a power converter includes a first comparator configured to receive a first signal and a second signal and generate a first comparison signal based on at least information associated with the first signal and the second signal. The first signal is associated with at least an output current of a power converter. Additionally, the system includes a second comparator configured to receive a third signal and a fourth signal and generate a second comparison signal based on at least information associated with the third signal and the fourth signal. The third signal is related to the second signal, and the fourth signal is associated with a primary current flowing through a primary winding of the power converter. Moreover, the system includes a logic component configured to receive at least the second comparison signal and generate a logic signal based on at least information associated with the second comparison signal, a pulse-width-modulation generator configured to receive at least the first comparison signal and the logic signal and generate a modulation signal based on at least information associated with the first comparison signal and the logic signal, and a driver component configured to receive the modulation signal and output a drive signal to a switch to adjust the primary current. For example, the system is implemented according to FIG. 4, FIG. 6, and/or FIG. 7.

According to yet another embodiment, a method for regulating a power converter includes receiving a first signal and a second signal, and the first signal is associated with at least an output current of a power converter. Additionally, the method includes processing information associated with the first signal and the second signal, generating a first comparison signal based on at least information associated with the first signal and the second signal, and receiving a third signal and a fourth signal, the third signal being related to the second signal. The fourth signal is associated with a primary current flowing through a primary winding of the power converter. Moreover, the method includes processing information associated with the third signal and the fourth signal, generating a second comparison signal based on at least information associated with the third signal and the fourth signal, receiving at least the second comparison signal, processing information associated with the second comparison signal, and generating a logic signal based on at least information associated with the second comparison signal. Also, the method includes receiving at least the first comparison signal and the logic signal, generating a modulation signal based on at least information associated with the first comparison signal and the logic signal, receiving the modulation signal, and outputting a drive signal based on at least information associated with the modulation signal to adjust the primary current. For example, the method is implemented according to FIG. 4, FIG. 6, and/or FIG. 7.

According to yet another embodiment, a system for regulating a power converter includes a first comparator configured to receive a first signal and a second signal and generate a first comparison signal based on at least information associated with the first signal and the second signal, and the first signal is associated with at least an output current of a power converter. Additionally, the system includes a second comparator configured to receive a third signal and a fourth signal and generate a second comparison signal based on at least information associated with the third signal and the fourth signal. The third signal is related to the second signal, and the fourth signal is associated with a primary current flowing through a primary winding of the power converter. Moreover, the system includes a logic component configured to receive at least the second comparison signal and generate a logic signal based on at least information associated with the second comparison signal, and a pulse-width-modulation generator configured to receive at least the first comparison signal and the logic signal and generate a modulation signal based on at least information associated with the first comparison signal and the logic signal. The modulation signal is associated with a modulation frequency. Also, the system includes a driver component configured to receive the modulation signal and output a drive signal to a switch to adjust the primary current. Also, the system includes a first current generator configured to receive the modulation signal and output a compensation current based on at least information associated with the modulation frequency to generate a compensation voltage and adjust the first signal, and a second current generator configured to receive the modulation signal associated with the modulation frequency and output an offset current based on at least information associated with the modulation frequency to generate an offset voltage and adjust the fourth signal. For example, the system is implemented according to FIG. 9.

According to yet another embodiment, a method for regulating a power converter includes receiving a first signal and a second signal. The first signal is associated with at least an output current of a power converter. Additionally, the method includes processing information associated with the first signal and the second signal, generating a first comparison signal based on at least information associated with the first signal and the second signal, and receiving a third signal and a fourth signal, the third signal being related to the second signal. The fourth signal is associated with a primary current flowing through a primary winding of the power converter. Moreover, the method includes processing information associated with the third signal and the fourth signal, generating a second comparison signal based on at least information associated with the third signal and the fourth signal, receiving at least the second comparison signal, processing information associated with the second comparison signal, and generating a logic signal based on at least information associated with the second comparison signal. Also, the method includes receiving at least the first comparison signal and the logic signal, and generating a modulation signal based on at least information associated with the first comparison signal and the logic signal. The modulation signal is associated with a modulation frequency. Additionally, the method includes receiving the modulation signal, outputting a drive signal based on at least information associated with the modulation signal to adjust the primary current, outputting a compensation current based on at least information associated with the modulation frequency to generate a compensation voltage and adjust the first signal, and outputting an offset current based on at least information associated with the modulation frequency to generate an offset voltage and adjust the fourth signal. For example, the method is implemented according to FIG. 9.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An apparatus for a power converter, the apparatus comprising:

a first comparator configured to receive a first signal and a second signal and generate a first comparison signal based at least in part on the first signal and the second signal, the first signal being associated with at least an output current of a power converter;

a second comparator configured to receive a third signal and a fourth signal and generate a second comparison signal based at least in part on the third signal and the fourth signal, the third signal being related to the second signal, the fourth signal being associated with a current flowing through a primary winding of the power converter; and a modulation signal generator configured to receive the first comparison signal and the second comparison signal, generate a modulation signal based at least in part on the first comparison signal and the second comparison signal, and output the modulation signal for adjusting the current flowing through the primary winding of the power converter.

2. The apparatus of claim 1 and further comprising:

a first resistor including a first resistor terminal and a second resistor terminal;

a second resistor including a third resistor terminal and a fourth resistor terminal; and a capacitor including a first capacitor terminal and a second capacitor terminal;

wherein the second resistor terminal, the third resistor terminal, and the first capacitor terminal are connected to each other;

wherein:

the first resistor is configured to receive the second signal at the first resistor terminal; and the second comparator is further configured to receive the third signal from at least the first capacitor terminal.

3. The apparatus of claim 1 wherein the modulation signal generator includes at least an OR gate.

4. The apparatus of claim 1 wherein the modulation signal generator includes at least a flip-flop.

5. The apparatus of claim 1 wherein the modulation signal generator is used to output a drive signal to a switch, the switch being a bipolar transistor.

6. The apparatus of claim 1 wherein the modulation signal generator is used to output a drive signal to a switch, the switch being a MOS transistor.

7. The apparatus of claim 1 and further comprising a current generator configured to receive the modulation signal associated with a modulation frequency and output a compensation current based on at least information associated with the modulation frequency to generate a compensation voltage and adjust the first signal.

8. The apparatus of claim 7 wherein the current generator includes:

a frequency signal generator configured to receive the modulation signal and generate a frequency signal representing the modulation frequency based at least in part on the modulation signal;

a current converter configured to receive the frequency signal and generate a current signal based at least in part on the modulation frequency; and a current generation component configured to receive the current signal and output the compensation current based at least in part on the current signal.

9. The apparatus of claim 1 and further comprising a compensation network configured to perform attenuation and low-pass filtering on the second signal and generate the third signal.

10. The apparatus of claim 1 and further comprising:

a third comparator configured to receive the fourth signal and a first threshold signal and generate a third comparison signal based at least in part on the fourth signal and the first threshold signal; and a fourth comparator configured to receive the fourth signal and a second threshold signal and generate a fourth comparison signal based at least in part on the fourth signal and the second threshold signal;

wherein the modulation signal generator is further configured to receive the third comparison signal and the fourth comparison signal and generate the modulation signal based at least in part on the second comparison signal, the third comparison signal and the fourth comparison signal.

11. A method for a power converter, the method comprising:

receiving a first signal and a second signal, the first signal being associated with at least an output current of a power converter;

generating a first comparison signal based at least in part on the first signal and the second signal;

receiving a third signal and a fourth signal, the third signal being related to the second signal, the fourth signal being associated with a current flowing through a primary winding of the power converter;

generating a second comparison signal based at least in part on the third signal and the fourth signal;

receiving at least the first comparison signal and the second comparison signal;

generating a modulation signal based at least in part on the first comparison signal and the second comparison signal; and outputting the modulation signal for adjusting the current flowing through the primary winding of the power converter.

12. The method of claim 11 and further comprising:

processing information associated with the modulation signal, the modulation signal being related to a modulation frequency; and outputting a compensation current based on at least information associated with the modulation frequency to generate a compensation voltage and adjust the first signal.

13. An apparatus for a power converter, the apparatus comprising:

a first comparator configured to receive a first signal and a ramping signal and generate a first comparison signal based at least in part on the first signal and the ramping signal, the first signal being associated with at least an output current of a power converter;

a second comparator configured to receive a second signal and a threshold signal and generate a second comparison signal based at least in part on the second signal and the threshold signal, the second signal being associated with a current flowing through a primary winding of the power converter;

a modulation signal generator configured to receive at least the first comparison signal and the second comparison signal, generate a modulation signal based at least in part on the first comparison signal and the second comparison signal, and output the modulation signal for adjusting the current flowing through the primary winding of the power converter, the modulation signal being associated with a modulation frequency;

a first current generator configured to receive the modulation signal and output a compensation current based on at least information associated with the modulation frequency; and a second current generator configured to receive the modulation signal associated with the modulation frequency and output an offset current based on at least information associated with the modulation frequency.

14. The apparatus of claim 13 wherein the first current generator includes:

a frequency signal generator configured to receive the modulation signal and generate a frequency signal representing the modulation frequency based at least in part on the modulation signal; and a current converter configured to receive the frequency signal and generate a current signal based at least in part on the modulation frequency.

15. The apparatus of claim 14 wherein the first current generator further includes:

a current generation component configured to receive the current signal and output the compensation current based at least in part on the current signal.

16. The apparatus of claim 13 wherein the second current generator includes:

a frequency signal generator configured to receive the modulation signal and generate a frequency signal representing the modulation frequency based at least in part on the modulation signal; and a current converter configured to receive the frequency signal and generate a current signal based at least in part on the modulation frequency.

17. The apparatus of claim 16 wherein the second current generator further includes:

a current generation component configured to receive the current signal and output the offset current based at least in part on the current signal.

18. The apparatus of claim 13 wherein the compensation current is used to generate a compensation voltage and adjust the first signal.

19. The apparatus of claim 13 wherein the offset current is used to generate an offset voltage and adjust the second signal.

20. A method for a power converter, the method comprising:

receiving a first signal and a ramping signal, the first signal being associated with at least an output current of a power converter;

generating a first comparison signal based at least in part on the first signal and the ramping signal;

receiving a second signal and a threshold signal, the second signal being associated with a current flowing through a primary winding of the power converter;

generating a second comparison signal based at least in part on the second signal and the threshold signal;

receiving at least the first comparison signal and the second comparison signal;

generating a modulation signal based at least in part on the first comparison signal and the second comparison signal, the modulation signal being associated with a modulation frequency;

outputting the modulation signal for adjusting the current flowing through the primary winding of the power converter;

outputting a compensation current based on at least information associated with the modulation frequency; and outputting an offset current based on at least information associated with the modulation frequency.

* * * * *